INVENTOR.
Robert E. Kirk
Robert C. Woofter
Robert H. Sims
BY Craig V. Monton
Their Attorney Oct. 8, 1957  R. C. WOOFTER ET AL  2,809,361
MULTIPLE WIRE CONNECTOR
Filed Sept. 2, 1954  2 Sheets-Sheet 2

INVENTOR.
Robert E. Kirk
Robert C. Woofter
BY Robert H. Sims

Their Attorney

2,809,361

MULTIPLE WIRE CONNECTOR

Robert C. Woofter, Cortland, and Robert E. Kirk, Warren, Ohio, and Robert H. Sims, Oak Park, Mich., assignors to General Motors Corporation, Detroit, Mich., a corporation of Delaware Application September 2, 1954, Serial No. 453,791

2 Claims. (Cl. 339—176)

This invention relates to an electrical connector adapted for interconnection of mating terminal connections in electric line circuits.

With the many electrical components used on motor vehicles of current production, the electric wiring circuits are quite complex. Considerable time and expense goes into electrical wiring in a motor vehicle to provide proper electric circuits and interconnection of circuits for the several electrical components used on the vehicle.

With electric circuits becoming more complex, it is currently the practice to arrange a plurality of wires in what is termed a "wiring harness" with the several electric wires in the harness being arranged for connection to the electric components, the wiring having the necessary length and positioning relative to other wires for proper electrical connection with their electric components. It is not possible to provide a single wiring harness that would encompass the entire electrical system of a motor vehicle. Hence, it is necessary to arrange for interconnection of wires from one wiring harness to another to extend the electric circuits to the desired electrical components on the vehicle. This has been done conventionally by providing individual terminal connectors for the several wires that would be extended between cooperating wiring harnesses. However, this also is an expense and a time consuming operation in interconnecting the individual wires from one harness to another. Also, the interconnection of individual wires from one harness to another leads to improper wiring connections even though the wires are thoroughly color coded.

It is therefore an object of this invention to provide an electrical connector for a wiring harness in which the wire ends having the terminal connections are carried for interconnection with a cooperating electrical connector on a cooperating wiring harness also having terminal connections therein that mate with the terminal connections in the first connector.

In the manufacture of wiring harness it has been common to provide multiple connectors, but the terminal connections have each been required to be placed in a plug connector at the time the wire is properly threaded in the harness. The plug connector therefore becomes a permanent part of the wiring harness before completion. Thus if any mistake by the assemblying operators in proper positioning of the electric wire in the wiring harness occurs, the mistake will not show up until final testing of the harness and then since the plug connector is a permanent part of the harness it will be necessary to disassemble the complete harness to correct for a single mistake of wire threading.

It is therefore an object of this invention to provide plug connectors that are adapted to receive multiple wire ends provided with terminal connections after the wiring harness has the wire threading operations completed. Thus if any mistake is made in wire threading in the harness it will not be necessary to disconnect the plug connectors from the harness before correction can be made for the improper wire threading.

Further, since it is possible by this invention to place the plug connectors onto the wiring harness after assembly of the wires, an operator performing the wire threading operation need only remember the pattern for laying of one particular wire rather than the pattern for a plurality of wires that would ultimately come together in a single plug connector. The plug connector can therefore be placed in operative connection with the multiple wire ends by an operator that has only this job to perform.

It is therefore an object of this invention to provide a plug connector body in which the wire ends having terminal connections thereon can be inserted into openings in the body by passing the wire through a peripheral slot in the body that leads to the passage for receiving the terminal connection, the terminal connection being drawn into the passage in the body after the wire enters the passage through the peripheral slot in the body.

It is also an object of the invention to provide a plug connector in which one of the body parts of the plug connector is a resilient body structure into which terminal ends can be placed, the resiliency of the connector body retaining the terminal connections in place in the body. Also, the resiliency of the connector body is adapted to provide for retention of the body in an opening in a panel in which the body is adapted to be mounted.

Further objects and advantages of the present invention will be apparent from the following description, reference being had to the accompanying drawings wherein a preferred form of the invention is clearly shown.

Figure 1:
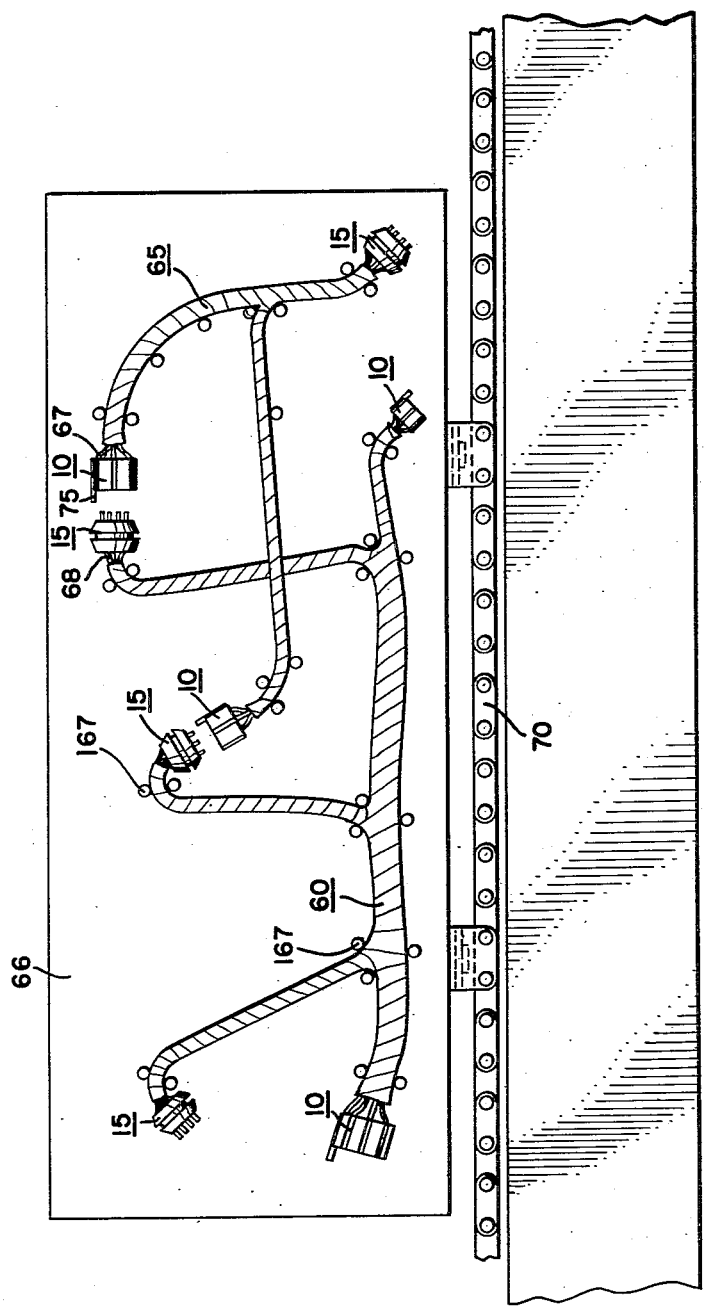
Figure 1 is a diagrammatic representation of wiring harness structures incorporating the electrical connector of this invention.

The electrical connector of this invention comprises a non-resilient body part 10 and a resilient body part 15, both of which are constructed of electrical insulating material.

The body part 10 is provided with a plurality of through passages 11 that are disposed radially about the axis of the body part 10. The body 10 is provided with a plurality of slots 12 each of which extends radially from one of the through passages 11, as shown in Figure 4 and is coextensive with the length of the through passage 11 as shown in Figure 8.

The through passage 11 has a reduced diameter portion 13 at one end thereof whereby the body 10 forms an annular shoulder 14 at one end of the through passage 11.

An axial through passage 16 is provided in the body 10 and also has a reduced diameter portion 17 whereby the body forms shoulder 18 at one end of the through passage 16. Coaxial with the through passage 16 there is formed an extension 19 on the body 10 that is provided with a bore 20 coaxial with the through passage 16.

Figure 4:
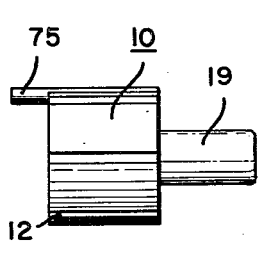
Figure 4 is an end elevational view of the body part illustrated in Figure 3, as viewed from the left hand end thereof.
Figure 3:
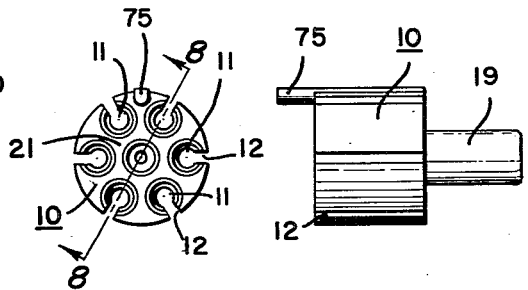
Figure 3 is an elevational view of one of the body parts of the connector shown in Figure 2.
Figure 8:
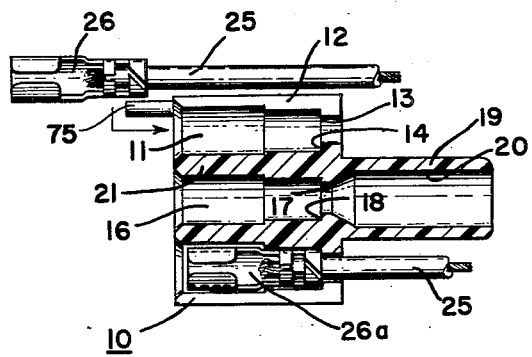
Figure 8 is a transverse cross sectional view of the body part shown in Figures 3 and 4 taken along line 8—8 of Figure 4.

It will be noted that each of the through passages 11 disposed radially around the body 10 has the slot 12 extending longitudinally thereof and coextensive therewith, whereas, the through passage 16 has a closed peripheral wall 21, as shown in Figures 4 and 8.

An insulated wire 25 having a terminal 26 on the end thereof is adapted for insertion into the through passage 11, the terminal 26 having a larger diameter than the insulated wire 25. The wire 25 is of a diameter that it will pass transversely through the slot 12 to position the wire within the through passage 11 and out the reduced diameter portion 13 thereof. The wire 25 is then moved axially of the body 10 to position the terminal 26 within the through passage 11 in the body 10 as shown by the terminal position 26a of Figure 8, the terminal abutting the shoulder 14. With the terminal 26a within the passage 11, it is apparent that it will not be movable radially from the passage 11.

A similar wire 25 with a terminal 26 thereon is adapted to be positioned in the axial through passage 16 with the terminal resting in the passage in the same position therein as the terminal 26a rests in the passage 11. However, to insert a wire end terminal in the passage 16, the wire must be threaded axially through the passage 16 and the reduced diameter opening 17 and then through the bore 20, the terminal being pulled axially into the passage 16. Obviously with a wire end terminal in the passage 16 the body part 10 will not fall from the end of the wire received in the passage 16.

It is of course understood that if desired any one of the passages 11 could have a closed periphery like that of passage 16 to provide a passage in which a wire end terminal is disposed to prevent the body part 10 from being removed from that particular wire. Such an arrangement is particularly useful in assembling the body part into a wiring harness as one wire will retain the body part with the wiring harness during the several wire threading operations and it will be in position for insertion of other wires in the body part either by other operators or have all wires inserted in it at one time by a special operator.

Figure 7:
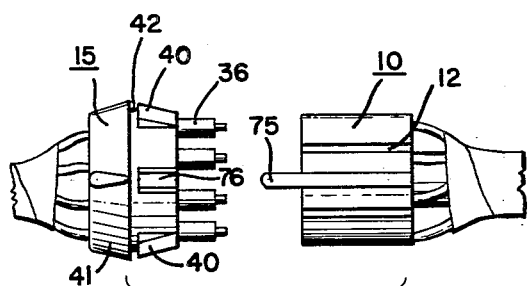
Figure 7 is an elevational view showing the relationship of the body parts shown in Figures 3 and 5 prior to bringing them into cooperative engagement, as shown in Fig. 2.

When all of the wires are assembled in the body part 10, as shown in Fig. 7, they are grouped about the extension 19 and can be taped together as a group to retain the terminals 26 in the several through passages in the body 10.

Figure 5:
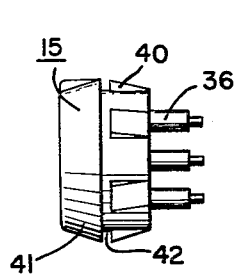
Figure 5 is an elevational view of another of the body parts of the connector illustrated in Figure 2.
Figure 6:
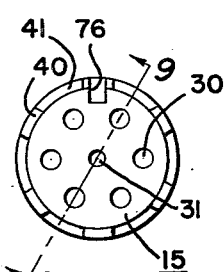
Figure 6 is an end elevational view of the body part illustrated in Figure 5, as taken from the right hand end thereof.
Figure 9:
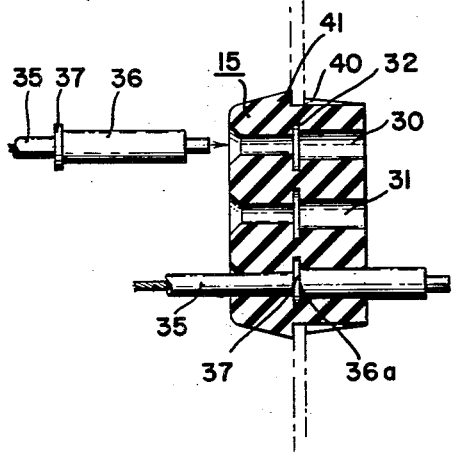
Figure 9 is a transverse cross sectional view of the body part shown in Figures 5 and 6 taken along line 9—9 of Figure 6.

A second body part 15, shown in Figures 5 and 6, and in cross section in Figure 9, comprises a resilient body structure that can be made from a rubber-like substance.

The body part 15 is provided with a plurality of through passages 30 that are adapted to coaxially align with the through passages 11 in the body part 10. The body part 15 is also provided with an axial passage 31 adapted to align with the axial passage 16 in the body part 10.

Each of the through passages 30 and 31 in the body part 15 has a radially enlarged portion 32 positioned within the body 15 and disposed intermediate opposite ends of the respective through passages.

An insulated wire 35 having a terminal end 36 thereon is adapted for insertion into the body part 15. The terminal connection 36 is provided with a radial flange 37 that is complementary to the passage enlargement 32 and adapted to be seated therein.

The terminal connection 36 is moved axially into the body part 15 until the radial flange 37 seats in the passage enlargement 32 as shown by the position of the terminal 36a. The terminal 36 will project from the right hand face of the body 15. Each of the passages 30 and 31 is adapted to receive a terminal connection 36, as shown in Fig. 7, or at least those passages that are adapted to have the terminals mate with terminals in corresponding passages 11 or 16 in the body member 10.

It will be appreciated that since the body member 15 is made from a resilient rubber-like material that the terminals 36 will cause sufficient exapnsion of the through passages 30 or 31 to permit entry of the flange 37 into seating position in the passage enlargement 32 and the resilient body 15 will resiliently retain the terminal connections 36 in the body 15. Also, since the body 15 is made of a resilient rubber-like material, any slight misalignment axially of the passages 30 or 31 in the body part 15 with the passages 11 or 16 in the body part 10 will be automatically compensated since the body 15 is of sufficient resilience to allow for alignment of the terminal connections 36a with the terminal connections 26a for proper connection and seating of the mating terminals.

Figure 2:
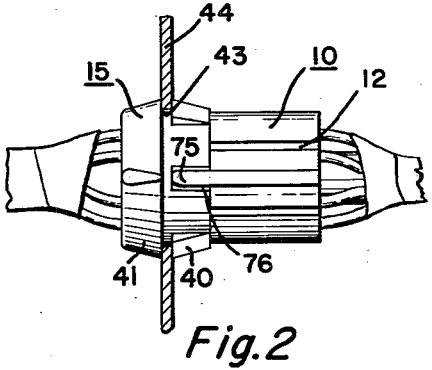
Figure 2 is an elevational view of an electrical connector constructed in accordance with this invention.

The body part 15 is provided with a plurality of angularly disposed projections 40 disposed around the periphery of the body part that are spaced from one another. These projections 40 cooperate with a shouldered enlargement 41 and spaced therefrom to provide a peripheral groove 42 adapted to receive the edge of an opening 43 in the panel 44 in which the body part 15 may be mounted, as illustrated in Figure 2.

In Figure 1 there is shown diagrammatically harness structures 60 and 65 that have had the several wires of the harness structures properly threaded on a pattern board 66 over a series of pins 167. The harness structure 60 can have the wires thereof threaded on a pattern board independent of the harness board 66 or they can both be threaded on the same board as illustrated in the figure of the drawing. Normally each wiring harness has the wires thereof assembled on its own pattern board but for convenience of illustration the wiring harnesses 60 and 65 are illustrated as having their wires threaded in a suitable pattern on a common board 66. The wires 67 in the harness 65 are adapted to be connected with the wires 68 in the harness 60. For this purpose the wires 67 are placed in a connector body 10, as previously described and the wires 68 are placed in a connector body 15 as previously described. Since all of the wires can be threaded in proper position for each harness prior to connection of the wires with the connector parts 10 and 15, it will be appreciated that each wiring harness 60 and 65 can be a completely manufactured item less the connector bodies 10 and 15 and tested as such prior to connection of the several wires to the bodies 10 and 15 as heretofore described. The pattern board 66 on which the wiring harnesses are assembled is adapted to be carried before the necessary operators on a track 70, each operator performing an independent function in threading a wire in proper pattern over the pattern board for incorporation in the final harness.

In joining the body part 10 with the body part 15 after the wires 67 and 68 of the wiring harnesses have been placed in their proper positions in the respective body parts, the projection 75 on the body part 10, is adapted to align and enters the recess 76 in the body part 15 thereby properly coaxially aligning the several wires in the respective body parts to complete extensions of electric circuits.

While the form of embodiment of the invention as herein disclosed constitutes a preferred form, it is to be understood that other forms might be adopted as may come within the scope of the claims which follow.

What is claimed is as follows:

1. A connector comprising a cylindrical body of insulating material, said body having a plurality of through passages in parallel arrangement radially disposed in the body, each of said passages having a peripheral slot coextensive with the length thereof, said body also having a through passage axial thereof and having a closed periphery, said radially disposed passages receiving wires with terminal connections of larger diameter than the wire insulation with the wires only passing through the peripheral slots and the terminals moving axially only into the said passage, said axial passage receiving one similar wire and terminal but only axial thereof to retain the connector on the said one wire.

2. A connector comprising a cylindrical body of insulating material, said body having a plurality of through passages in parallel arrangement radially disposed in the body, each of said passages having a peripheral slot co-extensive with the length thereof, said body also having a through passage axial thereof and having a closed periphery, said radially disposed passages receiving wires with terminal connections of larger diameter than the wire insulation with the wires passing through the peripheral slots and the terminals moving axially into the said passage, said axial passage receiving a similar wire and terminal but only axial thereof whereby said last mentioned wire prevents removal of the connector from the wire, said body including an axial projection on one side of the body with said axial passage extending through the said axial projection.

References Cited in the file of this patent

UNITED STATES PATENTS

| | | |
|---|---|---|
| 1,521,102 | Jackson | Dec. 30, 1924 |
| 1,942,586 | White | Jan. 9, 1934 |
| 1,953,594 | Douglas | Apr. 3, 1934 |
| 2,275,800 | Olson | Mar. 10, 1942 |
| 2,441,907 | Schmitt | May 18, 1948 |
| 2,563,712 | Frei et al. | Aug. 7, 1951 |
| 2,633,483 | Hafke | Mar. 31, 1953 |
| 2,652,549 | Ingalls et al. | Sept. 15, 1953 |

FOREIGN PATENTS

| | | |
|---|---|---|
| 633,575 | France | Apr. 29, 1927 |